(12) United States Patent
Korkishko et al.

(10) Patent No.: US 8,036,249 B2
(45) Date of Patent: Oct. 11, 2011

(54) SYSTEM AND METHOD OF DATA VERIFICATION

(75) Inventors: Tymur Korkishko, Suwon-si (KR); Kyung-Hee Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 407 days.

(21) Appl. No.: 12/003,708

(22) Filed: Dec. 31, 2007

(65) Prior Publication Data

US 2009/0022180 A1 Jan. 22, 2009

(30) Foreign Application Priority Data

Jul. 18, 2007 (KR) .................. 10-2007-0071941

(51) Int. Cl.
*H04J 3/12* (2006.01)
(52) U.S. Cl. ........ 370/522; 380/247; 380/251; 380/252; 380/255; 380/275; 704/200; 704/270; 704/273; 704/275; 713/150
(58) Field of Classification Search .................. 370/464, 370/498, 522; 380/247–286, 44–47; 713/150–181; 704/200, 270, 273, 275; 726/22–25
See application file for complete search history.

(56) References Cited

U.S. PATENT DOCUMENTS

| 7,454,418 B1 * | 11/2008 | Wang .............................. 707/6 |
| 2003/0149874 A1 | 8/2003 | Balfanz et al. |
| 2005/0265554 A1 | 12/2005 | Walker et al. |
| 2006/0174116 A1 | 8/2006 | Balfanz et al. |
| 2006/0233362 A1 * | 10/2006 | Deans et al. .................... 380/42 |
| 2008/0229110 A1 * | 9/2008 | Balfanz et al. ................ 713/176 |

FOREIGN PATENT DOCUMENTS

KR 1998-069643 10/1998

* cited by examiner

*Primary Examiner* — Hassan Kizou
*Assistant Examiner* — Charles Jiang
(74) *Attorney, Agent, or Firm* — NSIP Law

(57) ABSTRACT

A data verification method and system is provided. The data verification method includes the steps of transmitting data from a sender to a receiver over a signaling channel, transmitting a first set of bits to the receiver over a voice channel, wherein the first set of bits is generated using the data in the sender, and verifying the data through comparison between the first set of bits and a second set of bits that is generated based on the data in the receiver. The first and the second sets of bits may be a group of bits that are selected from a hash value using a selection mask in the sender and the receiver respectively, wherein the section mask has the same length as the hash value and the hash value is calculated based on the data, and the selection mask may be pre-defined between the sender and the receiver.

25 Claims, 10 Drawing Sheets

SYSTEM AND METHOD OF DATA VERIFICATION

CROSS-REFERENCE TO RELATED APPLICATION

This application claims the benefit under 35 U.S.C. §119 (a) of a Korean Patent Application No. 10-2007-0071941, filed on Jul. 18, 2007 in the Korean Intellectual Property Office, the entire disclosure of which is hereby incorporated by reference.

BACKGROUND OF THE INVENTION

1. Field of the Invention

The present invention relates to a voice packet network that is a communication scheme enabling communication over the Internet, wherein the voice packet network uses an existing packet network for data communication for an Internet phone and is referred to as Voice over Internet Protocol (VoIP). More particularly, the present invention relates to a communication service technology that converts voice data into an Internet protocol data packet to enable communication over a general Internet network. This method enables communication among a plurality of users at the same time using the VoIP, and can also provide a communication service with an excellent expandability and a relatively inexpensive fee in comparison to an existing telephone.

2. Description of Related Art

A conventional technology is based on a self-curing Voice over Internet Protocol (VoIP) system proposed by Palo Alto Research Center (PARC) and Samsung Advanced Institute of Technology (SAIT). The system provides a general framework for data verification, but does not provide an actual mechanism for data transmission.

Accordingly, there is a need for a method and system of data verification that can transmit data over a signaling channel, embed a set of bits into voice data, and transmit the same thereby verifying the data.

SUMMARY OF THE INVENTION

Exemplary embodiments of the present invention address at least the above problems and/or disadvantages and provide at least the advantages described below. Accordingly, an aspect of exemplary embodiments of the present invention is to provide a method and system of data verification that can transmit data over a signaling channel, embed a set of bits into voice data, and transmit the same thereby verifying the data. The voice data is transmitted over a voice channel, and the set of bits is a subset of bits with respect to a hash value of the data.

An aspect of exemplary embodiments of the present invention also provides a method and system of data verification that can select an appropriate parameter, and thereby adjust characteristics, such as voice quality, transmission performance, a security level, and the like.

According to one aspect of exemplary embodiments of the present invention, there is provided a method of verifying data, the method including the steps of transmitting the data from a sender to a receiver over a signaling channel, transmitting a first set of bits to the receiver over a voice channel wherein the first set of bits is generated using the data in the sender, and verifying the data through a comparison between the first set of bits and a second set of bits, wherein the second set of bits is generated based on the data in the receiver.

According to another aspect of exemplary embodiments of the present invention, the first set of bits and the second set of bits may be a group of bits that are selected from a hash value using a selection mask in the sender and the receiver respectively, wherein the section mask has the same length as the hash value and the hash value is calculated based on the data, and the selection mask may be pre-defined between the sender and the receiver.

According to a further aspect of exemplary embodiments of the present invention, the step of transmitting the first set of bits may include the steps of calculating a hash value of the data, selecting the first set of bits from the hash value and embedding the selected first set of bits into voice data, and transmitting the voice data embedded with the first set of bits to the receiver over the voice channel.

In an aspect of exemplary embodiments of the present invention, the step of selecting and embedding may include the steps of determining an action of a block of voice samples (BVS) and a bit position of the first set of bits based on a number of bits of the first set of bits and synchronization information (SI), selecting a bit corresponding to the bit position from the bits included in the first set of bits, and embedding the first set of bits into the voice data based on the selected bit and the action.

According to one aspect of exemplary embodiments of the present invention, the step of verifying the data may include the steps of calculating a hash value of the data, wherein the data is received over the signaling channel from the sender, selecting the second set of bits from the hash value, and verifying the data through the comparison between the first set of bits and the second set of bits, wherein the first set of bits is received from the sender over the voice channel.

According to another aspect of exemplary embodiments of the present invention, there is provided a data verification system including a sender for transmitting data over a signaling channel and transmitting a first set of bits over a voice channel, wherein the first set of bits is generated based on the data, and a receiver for receiving the data, generating a second set of bits based on the received data, comparing the first set of bits with the second set of bits, and verifying the data.

Other aspects, advantages, and salient features of the present invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following detailed description, taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters exemplified in the description such as a detailed construction and elements are provided to assist in a comprehensive understanding of the exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Embodiments of the present invention are applicable to self-securing Voice-over-Internet Protocol (VoIP) systems, for example, VoIP terminals, that send data for verification over a voice channel. The terms "sender" and "receiver" may indicate terminals, such as the VoIP terminals, or may indicate functions or devices that are included in the terminals, respectively. Also, both the sender and the receiver may be provided in one terminal. For example, a data verification method and system according to an exemplary embodiment of the present invention may verify data between each terminal, including devices or functions of the sender and the receiver.

Figure 1:
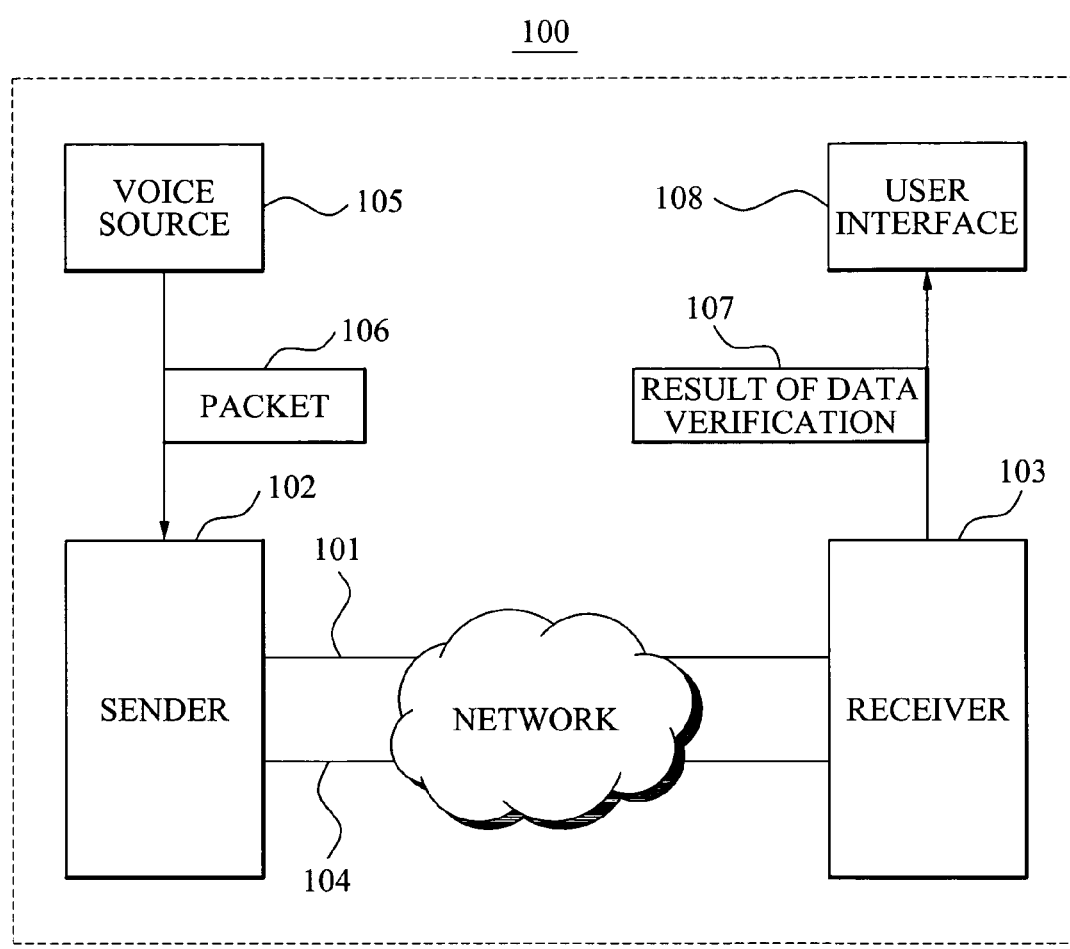
FIG. 1 illustrates a schematic diagram for explaining a data verification method according to an exemplary embodiment of the present invention.

FIG. 1 illustrates an example for explaining a data verification method according to an exemplary embodiment of the present invention;

In a data verification system 100, a signaling channel 101 is used between a sender 102 and a receiver 103 to transmit data, and to establish and control a connection with a voice channel 104. The voice channel 104 is used to transport voice data between the sender 102 and the receiver 103. The signaling channel 101 and the voice channel 104 can be created using any existing technology, for example, Transmission Control Protocol/Internet Protocol (TCP/IP), Real Time Protocol (RTP), and the like. Voice data, transmitted over the voice channel 104, can be generated by a voice source 105, and can be realized in a packet 106.

In the data verification system 100, the sender 102 transmits the data to the receiver 103 over the signaling channel 101, and transmits a subset of bits of a hash value of the data to the receiver 103, using the packet 106 over the voice channel 104. Through the above operation, the receiver 103 is enabled to verify the data.

A result of the data verification 107 may be provided to a user via a user interface 108 included in the receiver 103.

Figure 2:
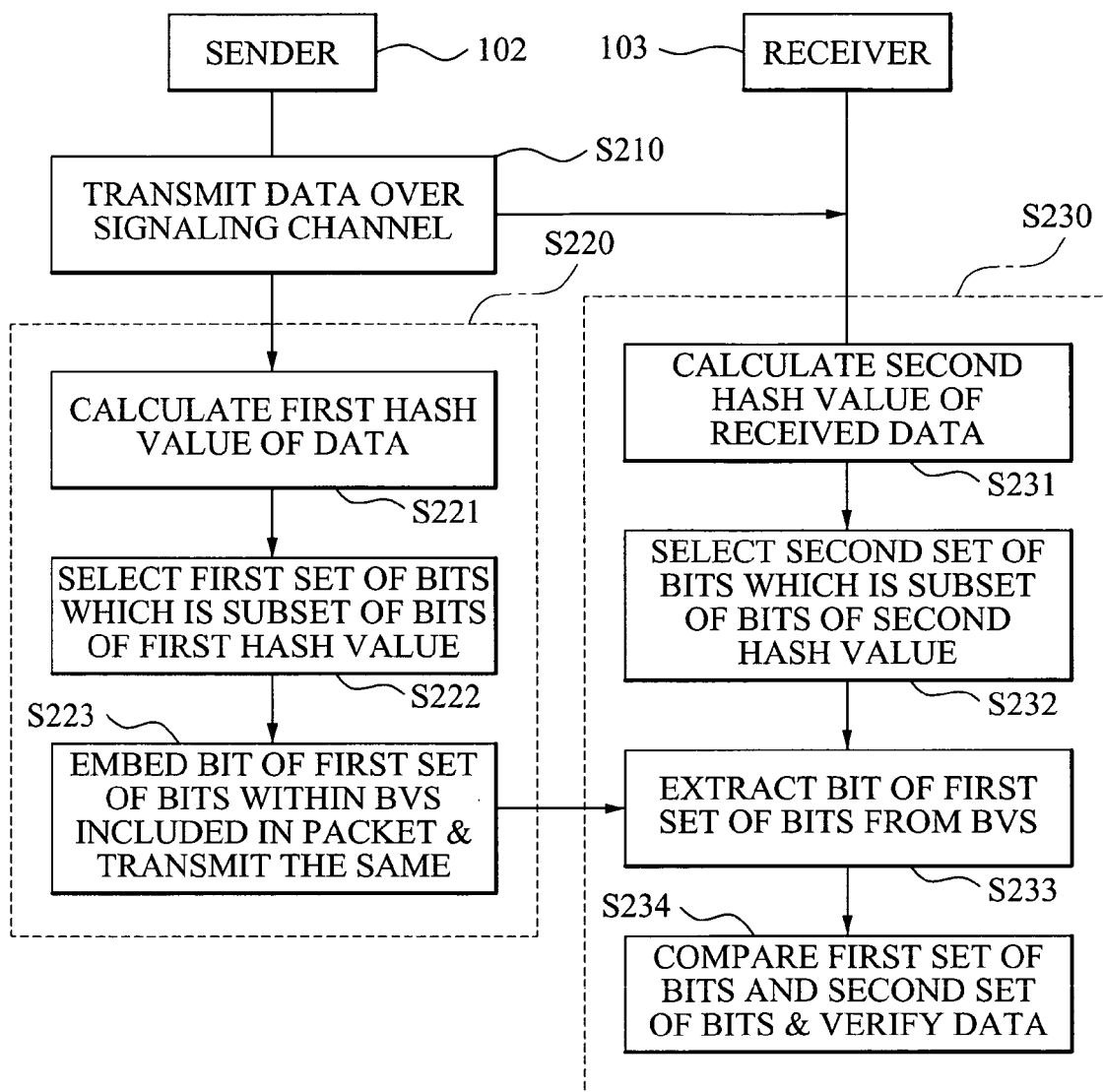
FIG. 2 illustrates a method of verifying data according to an exemplary embodiment of the present invention.

FIG. 2 illustrates a method of verifying data according to an exemplary embodiment of the present invention.

In step S210, the sender 102 described above with FIG. 1 transmits data to the receiver 103 over the signaling channel 101. Since the signaling channel 101 is insecure, the receiver 103 may receive a modified version of the data. For example, the data transmitted from the sender 102 may be replaced with another value by an adversary in a network. Therefore, a process of verifying the data is needed to determine whether the data is valid. For this, the transmitter 102 and the receiver 103 may perform steps S220 and S230, respectively.

In step S220, the sender 102 transmits a first set of bits to the receiver 103 over the voice channel 104. The first set of bits is generated using the data. As shown in FIG. 2, the sender 102 may perform steps S221 through S223 for generation of the first set of bits and transmission of the first set of bits over the voice channel 104.

In step S221, the sender 102 calculates a first hash value which is a hash value of the data. The sender 102 may use all the existing methods to use the first hash value. For example, Secure Hash Algorithm-1 (SHA-1), SHA-256, SHA-384, SHA-512, Message Digest algorithm 5 (MD5), and the like, may be used to calculate the first hash value.

In step S222, the sender 102 selects the first set of bits which is a subset of bits of the first hash value. The first set of bits may be a group of bits that are selected from the first hash value using a selection mask. The selection mask has the same length as the first hash value calculated based on the data. The selection mask may be pre-defined between the sender 102 and the receiver 103.

Accordingly, the length of the first set of bits is less than the length of the first hash value. Depending on how the length of the first set of bits is set, it is possible to provide a higher security level or a higher transmission performance. Specifically, a larger value of the length of the first set of bits increases a block of voice samples (BVS) to be embedded with bits of the first set of bits. Therefore, it is possible to provide a higher security level. Also, a smaller value of the length of the first set of bits reduces a process of embedding the bits into the BVS and thus it is possible to provide a higher transmission performance.

In step S223, the sender 102 may embed the bits of the first set of bits within a plurality of BVSs, which is included in at least one packet, and transmit the same to the receiver 103. Specifically, the sender 102 may embed the first set of bits within voice data for comparison with a second set of bits. Step S223 of embedding the bits of the first set of bits within the plurality of BVS and transmitting the same to the receiver 103 will be described in detail with reference to FIGS. 3 and 4.

In step S230, the receiver 103 verifies the data through comparison between the second set of bits and the first set of bits. The second set of bits is generated using the data. As described above, since the signaling channel 101 is insecure, the data may be modified or revised. Therefore, the receiver 103 may compare the first set of bits and the second set of bits, and verify the data. The first set of bits is received to verify validity of the data. For the above operation, step S230 may include steps S231 through S234 shown in FIG. 2.

In step S231, the receiver 103 calculates a second hash value using the data that is received from the sender 102 over the signaling channel 101. The data may be stored separately from calculation of the second hash value. The second hash value may be calculated using the same method as the method of calculating the first hash value in the sender 102. For example, when the sender 102 calculates the first hash value of the data using SHA-256, the receiver 103 also may calculate the second hash value of the data using SHA-256.

In step S232, the receiver 103 may select the second set of bits that is a subset of bits of the second hash value. The second set of bits may be selected from bits of the second hash value using the selection mask. As described above, the selection mask is pre-defined between the sender 102 and the receiver 103.

In step S233, the receiver 103 extracts the first set of bits from the voice data that is received from the sender 102 over the voice channel 104. Specifically, the receiver 103 extracts bits, which are included in the plurality of BVSs received in at least one packet, and thereby extracts the first set of bits. A method of extracting the first set of bits will be described in detail with reference to FIGS. 3 and 8.

The above-described steps S231 and S232 may be performed in the receiver 103 before performing step S223, and steps S233 and S234 may be performed after step S223. Specifically, step S233 may be performed after the receiver 103 receives the voice data transmitted from the sender 102 in step S223.

In step S234, the receiver 103 compares the second set of bits selected in step S232 and the first set of bits extracted in step S233, and thereby verifies the data. The receiver 103 may extract a single bit from each of the first set of bits and a second set of bits, and determine whether the extracted bits matches. The receiver 103 may determine the validity of the data using a number of matching bits and a number of non-matching bits. A method of verifying the data will be described in detail with reference to FIG. 8.

Figure 3:
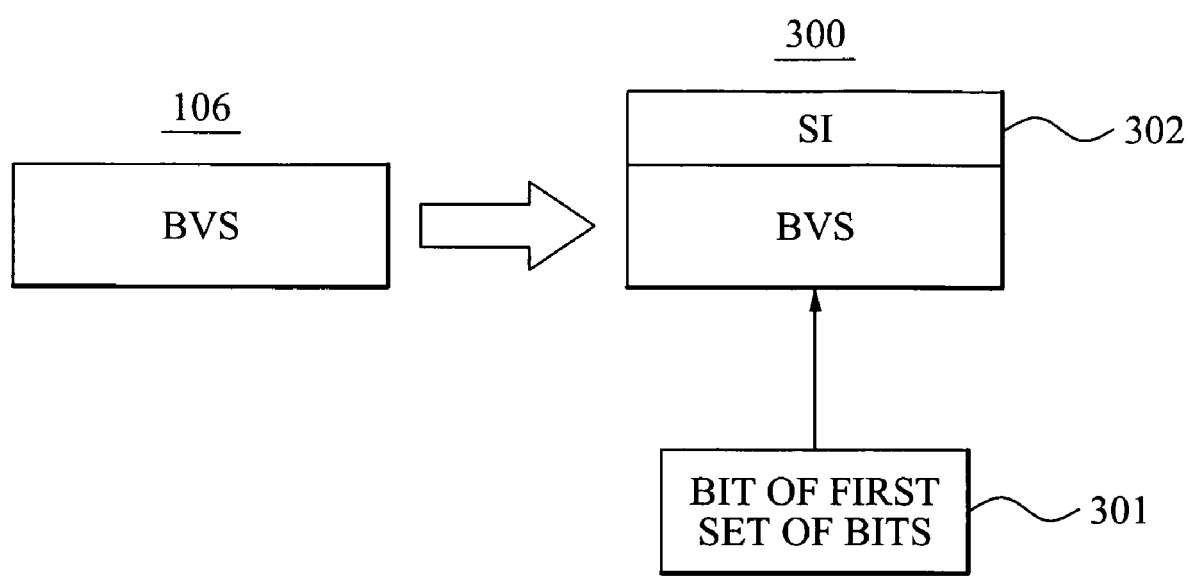
FIG. 3 illustrates an example of components of a packet according to an exemplary embodiment of the present invention.

FIG. 3 illustrates an example of components of a packet according to an exemplary embodiment of the present invention.

As described above with FIG. 1, voice data generated by the voice source 105 may include a plurality of BVSs. At least one BVS may be included in the packet 106.

The packet 106 may be constructed as a new packet 300 to transmit the first set of bits to the receiver 103. A single BVS may be embedded with one bit 301 among bits of the first set of bits, and the BVS embedded with the bit 301 may be combined with synchronization information (SI) 302, corresponding to the bit 301, to construct the packet 300. Also, the packet 300 may include a plurality of BVSs and plurality of SI pairs.

In other words, the plurality of BVSs including all the bits of the first set of bits respectively may be included in at least one packet 300 and be transmitted to the receiver 103 over the voice channel 104. Also, the receiver 103 may extract all the bits of the first set of bits from the plurality of BVS, using the SI, which is included in the at least one packet 300 together with the plurality of BVSs. Through the above operation, the receiver 103 may obtain the first set of bits.

Also, since the voice data is transmitted to the receiver 103 using a special unidirectional protocol, the sender 102 has no feedback from the receiver 103.

Figure 4:
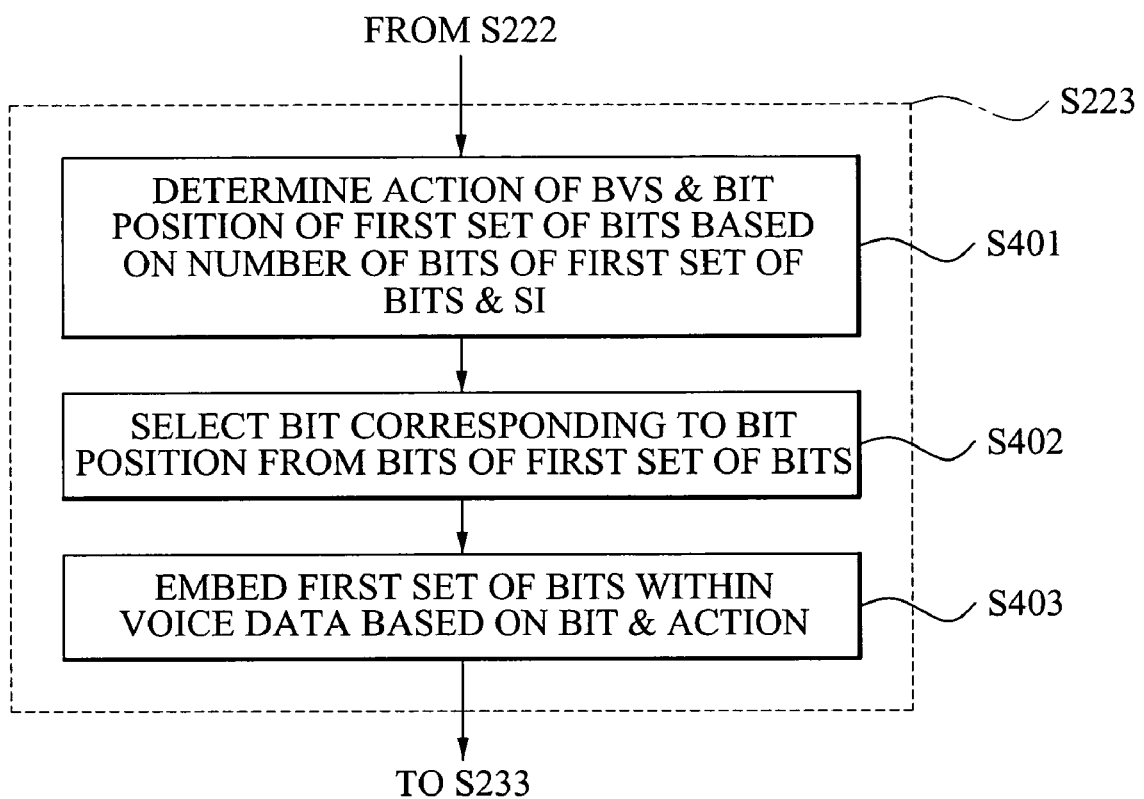
FIG. 4 is a flowchart illustrating a method of embedding a first set of bits into voice data and transmitting the same to a receiver in a sender according to an exemplary embodiment of the present invention.

FIG. 4 is a flowchart illustrating a method of embedding a first set of bits within voice data and transmitting the same to a receiver from a sender according to an exemplary embodiment of the present invention. In an aspect of exemplary embodiments of the present invention, steps S401 through S403 may be included in the above-described step S223 and thereby performed.

In step S401, the sender 102 determines an action of BVS and a bit position of the first set of bits based on SI and a number of bits of the first set of bits. The SI may include parameters, such as a number of skips (SKIP_NUM), a count of repeats (REPEAT_COUNT), and an encoding interval (ENCODE_INTERVAL). The action is to determine whether to embed the bit within the BVS. The action may include a process action that indicates a BVS to be embedded with the bit, and a bypass action that indicate a BVS to not be embedded with the bit.

Step S401 of determining the action of the BVS and the bit position based on the SI and the number of bits will be described in detail with reference to FIGS. 5 and 6.

In step S402, the sender 102 selects a bit corresponding to the bit position from the bits included in the first set of bits. The sender 102 may determine the action of the BVS to be embedded with the bit as the process action, select a bit corresponding to the process action, and embed the selected bit within the BVS. Operation S402 of selecting the bit based on the bit position will be described in detail with reference to FIG. 7.

In step S403, the sender 102 embeds the first set of bits within the voice data based on the bit and the action. The sender 102 may identify the action of the BVS. When the action is as a process action, the sender 102 may embed the bit within the BVS. When the action is similar to a bypass action, the sender 102 may skip the BVS. All the bits of the first set of bits may be embedded within all the BVSs, by repeating the above process with respect to the BVS of which actions are determined the process action.

Figure 5:
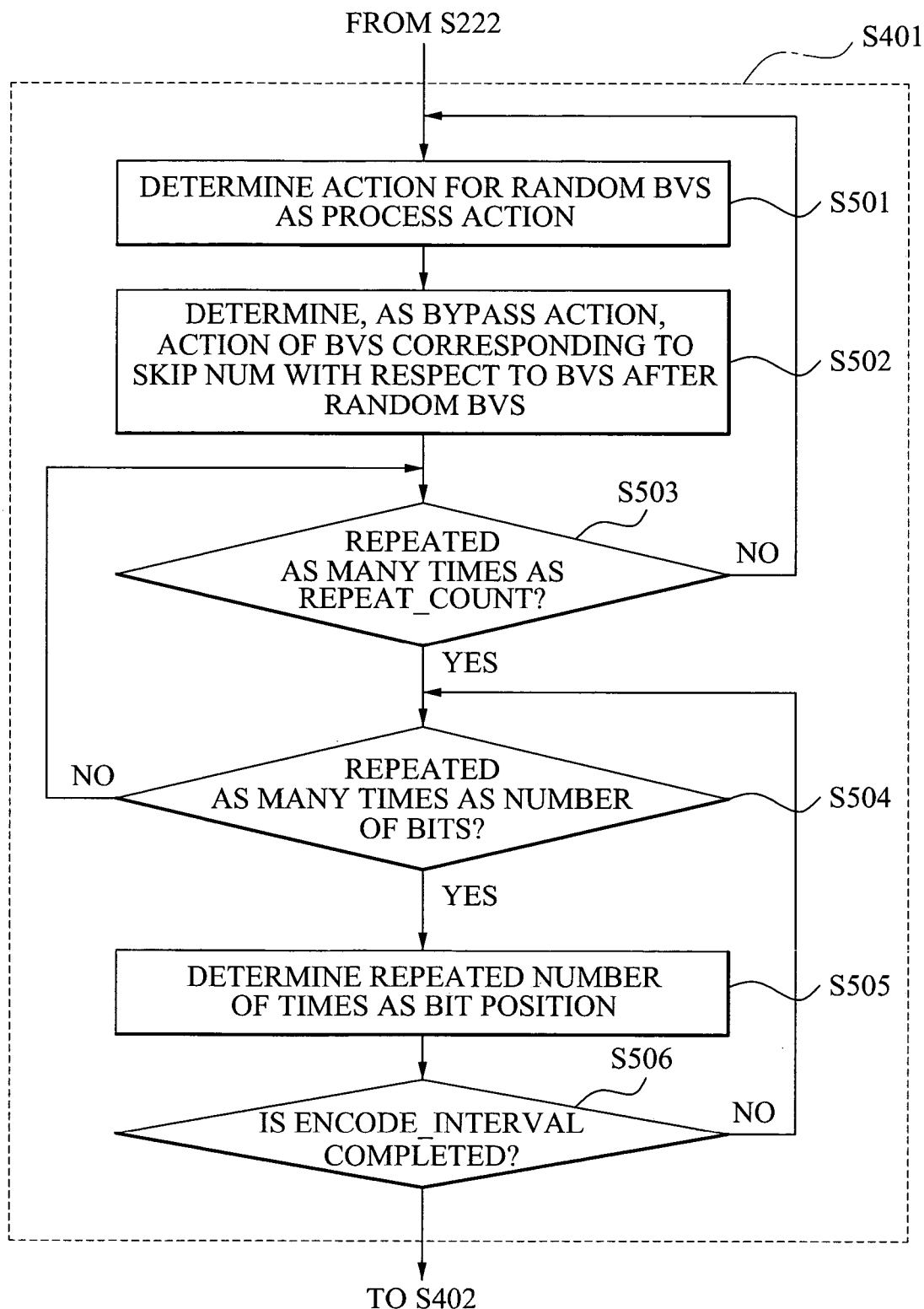
FIG. 5 is a flowchart illustrating a method of determining a bit position and an action of a block of voice samples (BVS) according to an exemplary embodiment of the present invention.

FIG. 5 is a flowchart illustrating a method of determining an action of a BVS and a bit position according to an exemplary embodiment of the present invention. In an aspect of exemplary embodiments of the present invention, steps S501 through S506 may be included in the above-described step S401 and thereby performed.

In step S501, the sender 102 determines an action for a random BVS as a process action. As described above with FIG. 4, the action of the BVS and the bit position may be determined based on the SI and the number of bits of the first set of bits. The SI may include parameters, SKIP_NUM, REPEAT_COUNT, and ENCODE_INTERVAL. When the ENCODE_INTERVAL starts, the sender 102 may determine an action of a current BVS, as the process action, among a plurality of BVSs that constitute voice data.

In step S502, the sender 102 determines, as a bypass action, an action of the BVS corresponding to the SKIP_NUM with respect to BVS after the random BVS. Specifically, the sender 102 determines, as the bypass action, actions of a BVS corresponding to the SKIP_NUM among a plurality of BVSs after the BVS of which the action is determined as the process action. The data verification system 100 may adjust the SKIP_NUM and thereby adjust a voice quality or a transmission performance. A larger SKIP_NUM may provide a higher voice quality and a smaller SKIP_NUM may provide a higher transmission performance.

In step S503, the sender 102 repeats, as many times as the REPEAT_COUNT, steps S501 and S502 with respect to a following BVS. The REPEAT_COUNT is to embed the same single bit, among the bits of the first set of bits, within the BVS of which the action is repeated as many times as the REPEAT_COUNT consecutively set as (*"sets"?*) the process action. Through this, the data verification system 100 may adjust the REPEAT_COUNT and thereby adjust a security level or a transmission performance. A larger REPEAT_COUNT may provide a higher security level, and a smaller REPEAT_COUNT may provide a higher transmission performance.

In step S504, the sender 102 repeats step S503 as many times as the number of bits. The BVS set to the process action corresponds to all the bits of the first set of bits by repeating step S503 as many times as the number of bits of the first set of bits.

In step S505, the sender 102 determines the repeated number of times in step S504 as a current bit position. For example, when the REPEAT_COUNT is '0', the bit position may be set to '0', so that a first bit of the bits of the first set of bits may be embedded within the BVS of which the action is determined as the process action. When the RE-PEAT_COUNT is '4', the bit position may be set to '4', so that a third bit of bits of the first set of bits may be embedded within the BVS of which the action is determined as the process action in a fourth iteration.

In step S506, the sender 102 repeats steps S504 and S505 during the ENCODE_INTERVAL. It is to repeatedly embed all the bits of the first set of bits during the ENCODE_INTERVAL, and to prevent loss of a packet in a network. In other words, a longer ENCODE_INTERVAL may provide a more reliable transmission. A shorter ENCODE_INTERVAL may provide better voice quality with a relatively smaller number of packets.

Figure 6:
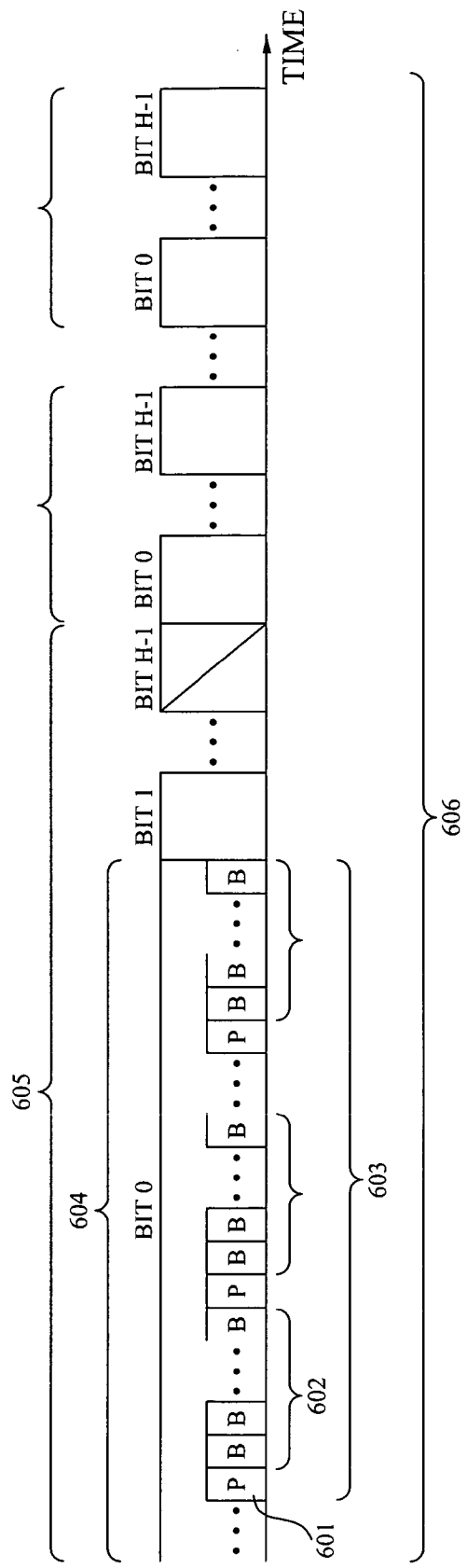
FIG. 6 illustrates a method of embedding a bit of a first set of bits into a BVS according to an exemplary embodiment of the present invention.

FIG. 6 illustrates a method of embedding a bit of a first set of bits within BVS according to an exemplary embodiment of the present invention.

When an action of a single BVS 601 is determined as a process action, as many BVSs as a SKIP_NUM 602 after the BVS 601 are skipped. This process is repeated, with respect to a first bit 604 of the first set of bits, as many times as a REPEAT_COUNT 603. Also, the above process may be repeated as many times as the number of bits of the first set of bits to determine the action of the BVS to be embedded with all the bits 605 of the first set of bits. The repeated number of times may be determined as a bit position.

Also, loss of the packet may be prevented in a network by repeating the above process during an ENCODE_INTERVAL 606.

When data is transmitted and verified by the data verification method as described above, the data verification system 100 may adjust various parameters, such as 1) the number of bits of the first set of bits, 2) the SKIP_NUM, 3) the REPEAT_COUNT, and 4) the ENCODE_INTERVAL, and thereby adjust characteristics such as voice quality, transmission performance, a security level, transmission reliability, and the like.

A method of embedding a selected bit within a BVS may be performed by any one of various types of known methods. The method is based on frequency filtering of a signal represented by BVS. For example, the method may use a first set of frequencies corresponding to embedding a bit '0' and a second set of frequencies corresponding to embedding a bit '1'. If a selected bit is '0', all the frequencies that are defined in the first set of frequencies may be removed from a voice signal and thereby the bit '0' may be embedded into the BVS. Also, if the selected bit is '1', all the frequencies that are defined in the second set of frequencies may be removed from the voice signal and thereby the bit '1' may be embedded into the BVS.

When the bits of the first set of bits are embedded into all the BVSs of which actions are determined as the process action by the above method, SI may be added to a packet including the BVS and the packet may be transmitted to the receiver 103 over the voice channel 104.

Figure 7:
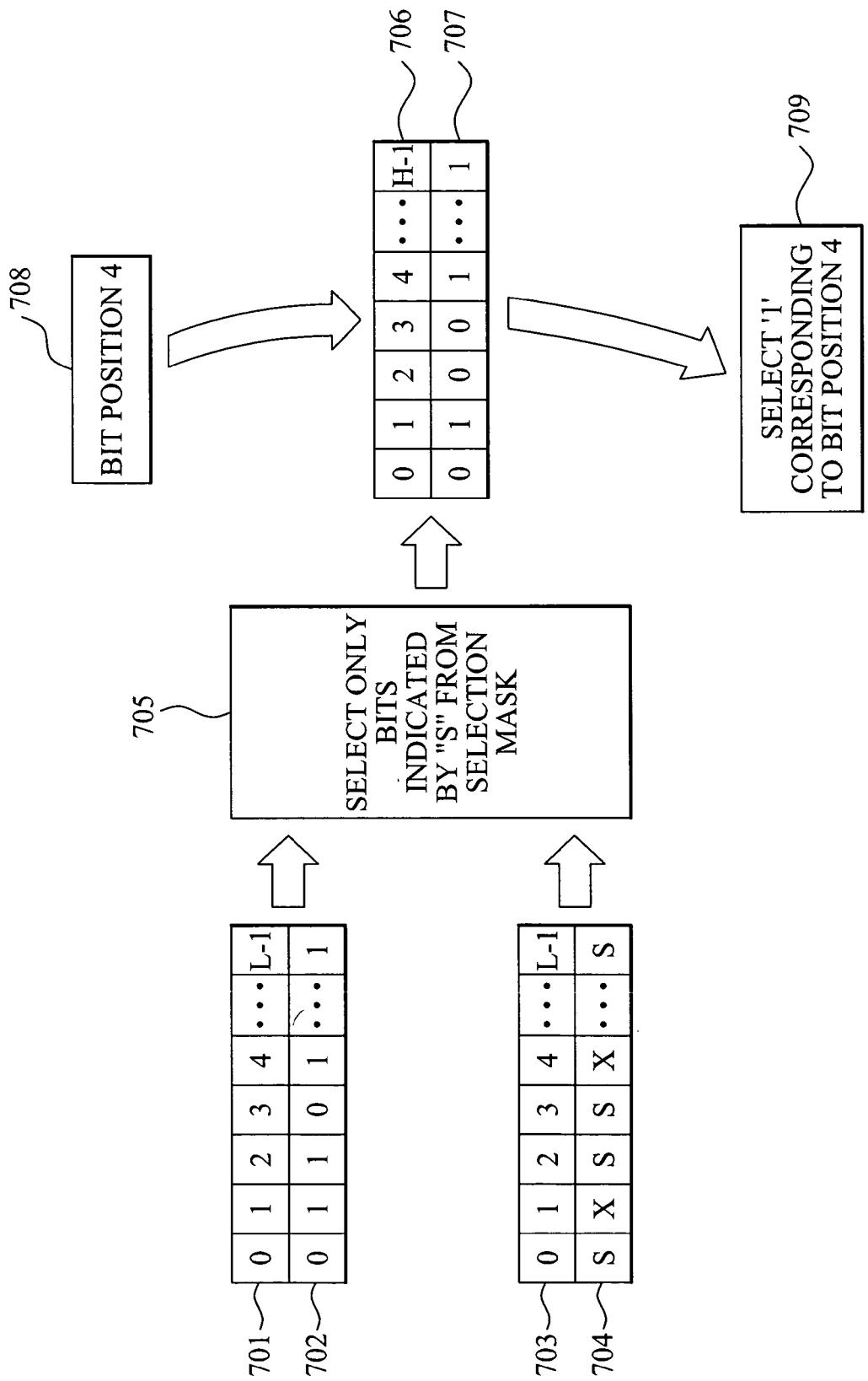
FIG. 7 illustrates a method of selecting a bit from a first set of bits according to an exemplary embodiment of the present invention.

FIG. 7 illustrates a method of selecting a bit from a first set of bits according to an exemplary embodiment of the present invention.

A first hash value may include a hash value 702 based on a bit position 701, and a selection mask indicates a bit selection 704 based on a bit position 703. Specifically, as shown in operation 705, it is possible to select only bits indicated by symbol "S" from the selection mask that has the same 'L−1' length as the first hash value, and thereby select a first set of bits with the 'H−1' length. The first set of bits may include bits 707 based on a bit position 706.

As described above with FIGS. 5 and 6, when a bit position '4' 708 is determined, based on SI, to select a bit to be embedded into a BVS, a value '1' corresponding to a bit position '4' 706 of the first set of bits may be selected in operation 709, and embedded into the BVS.

Figure 8:
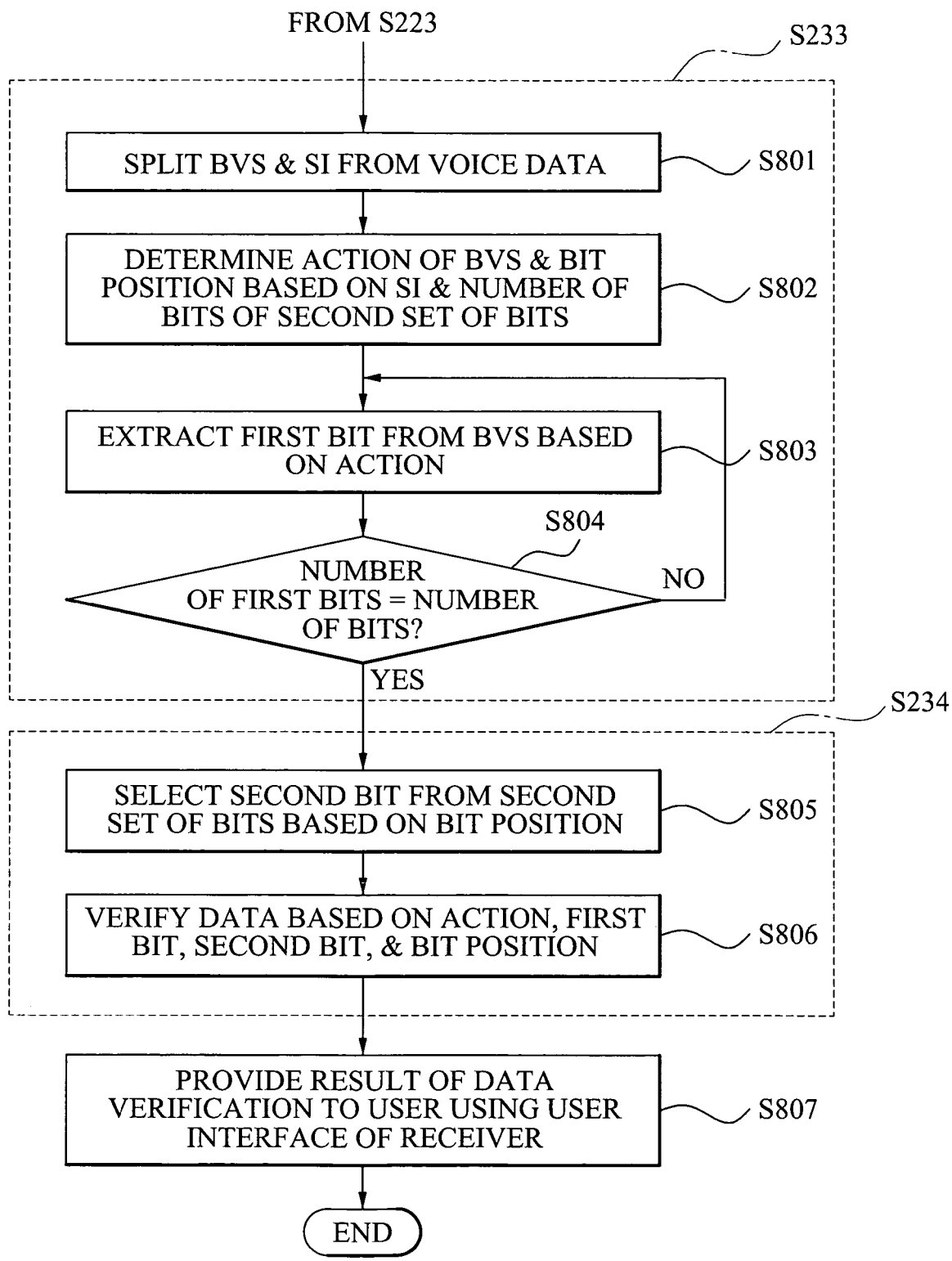
FIG. 8 is a flowchart illustrating a method of verifying data using bits of a first set of bits and bits of a second set of bits according to an exemplary embodiment of the present invention.

FIG. 8 is a flowchart illustrating a method of verifying data using bits of a first set of bits and bits of a second set of bits according to an exemplary embodiment of the present invention. In an aspect of exemplary embodiments of the present invention, steps S801 through S804 may be included in the above-described step S233 of FIG. 2, and thereby performed. Steps S805 and S806 may be included in step S234 and thereby performed. Also, step S807 may follow step S230.

In step S801, the receiver 103 splits a BVS and SI from voice data that is received over the voice channel 104. As described above, the voice data may include at least one packet, and each of the at least one packet may include at least one SI and BVS. The receiver 103 receives the voice data, and splits the BVS and the SI from the packet included in the voice data.

In step S802, the receiver 103 determines an action of BVS and a bit position based on the SI and a number of bits of the second set of bits. In an aspect of exemplary embodiment of the present invention, a method of determining the action of the BVS and the bit position is the same as the above-described method of determining the action of the BVS and the bit position in the sender 102.

Specifically, the SI may include parameters, a SKIP_NUM, a REPEAT_COUNT, and an ENCODE_INTERVAL. The receiver 103 may determine the action of the BVS as a process action, and determine, as a bypass action, an action of the BVS corresponding to the number of skips with respect to other BVSs after the BVS. After this, the above-process may be repeated as many times as the REPEAT_COUNT, and the entire process may be repeated as many times as the number of bits. The repeated number of times with respect to the entire process may be determined as a current bit position. Also, the receiver 103 may repeat all the processes during the ENCODE_INTERVAL, and determine all the actions of BVSs which are determined as either the process action or the bypass action. Also, the bit position may be determined to select a bit from the second set of bits.

In step S803, the receiver 103 extracts a first bit from the BVS based on the action. Specifically, the BVS of which action is determined as the process action is the BVS of which action is also determined as the process action in the sender 102, and is embedded with the first bit. Therefore, the receiver 103 may extract the first bit from the BVS of which action is determined as the process action.

In an aspect of exemplary embodiment of the present invention, a method of extracting the first bit in the receiver 103 may use a method corresponding to a method of embedding the first bit in the sender 102. For example, similar with the sender 102, the receiver 103 may determine a first set of frequencies and a second set of frequencies, remove all the frequencies defined in the first set of frequencies from a voice signal, and thereby calculate power 'P0'. Also, the receiver 103 may remove all the frequencies defined in the second set of frequencies from the same voice signal, calculate power 'P1', and then identify the first bit.

When 'P0'>'P1', '1' may be extracted as the first bit. When 'P0'<'P1', '0' may be extracted as the first bit. When 'P0'='P1', 'UNDECODED' may be output as a result. 'UNDECODED' denotes that the first bit cannot be determined. 'UNDECODED' may correspond to a predetermined integer denoting that the first bit cannot be determined.

In step S804, the receiver 103 determines whether a number of the extracted first bits is identical to a number of bits of the second set of bits. When identical, the receiver 103 performs step S805, and when different, the receiver 103 performs step S803. Since the number of bits of the first set of bits embedded within the received voice data is identical to the number of bits of the second set of bits, the receiver 103 may extract the first bit until the number of extracted first bits becomes equal to the number of bits of the second set of bits.

The comparison between the number of first bits and the number of bits of the second set of bits may be affected by the REPEAT_COUNT used in the sender 102. Specifically, bits of the first set of bits are doubly embedded into the BVS based on the REPEAT_COUNT. Thus, when the REPEAT_COUNT is greater than '2', the receiver 103 determines whether results of multiplication between the number of first bits and the REPEAT_COUNT are identical to the number of bits. When identical, the receiver 103 may perform step S805, and when different, the receiver 103 may perform S803.

In step S805, the receiver 103 selects a second bit from the second set of bits based on the bit position. The receiver 103 may select a bit corresponding to the bit position, as the second bit, from the second set of bits. For example, when the bit position is '5', the receiver 103 may select a fourth bit of the second set of bits as the second bit.

In step S806, the receiver 103 verifies the data based on the action, the first bit, the second bit, and the bit position. The first bit may be duplicated as many times as the REPEAT_COUNT used in the receiver 102. Thus, when a number of the first bits are embedded as many times as the REPEAT_COUNT, and is identical to a number of the second bits, bit matching may be performed.

In an aspect of exemplary embodiment of the present invention, the receiver 103 may compare the first bit and the second bit with respect to the action corresponding to the process action, and verify the data when a number of matching bits between the first bit and the second bit is greater than a predetermined first number, and a number of non-matching bits between the first bit and the second bit is less than a predetermined second number. The first number may be a minimum number of successful matching bits to verify the data. The second number may be a maximum number of non-matching allowed with respect to a non-matching error.

A larger minimum number may provide a higher security level, and a smaller minimum number may provide higher transmission performance since the data can be verified using a smaller size of voice data. Also, a smaller maximum number may allow less non-matching bits and thus provide a higher security level.

In step S807, the receiver 103 provides a result of the data verification to a user. Specifically, the receiver 103 may display the result of the data verification to the user via a user interface of the receiver 103.

As described above with FIG. 1, the data verification system 100 may include the sender 102 and the receiver 103. The sender 102 transmits data over the signaling channel 101, and transmits a first set of bits, generated based on the data, over the voice channel 104. The receiver 103 receives the data, generates a second set of bits based on the received data, compares the first set of bits with the second set of bits and verifies the data. Hereinafter, the internal configuration of the sender 102 and the receiver 103 will be described in detail with reference to FIGS. 9 and 10.

Figure 9:
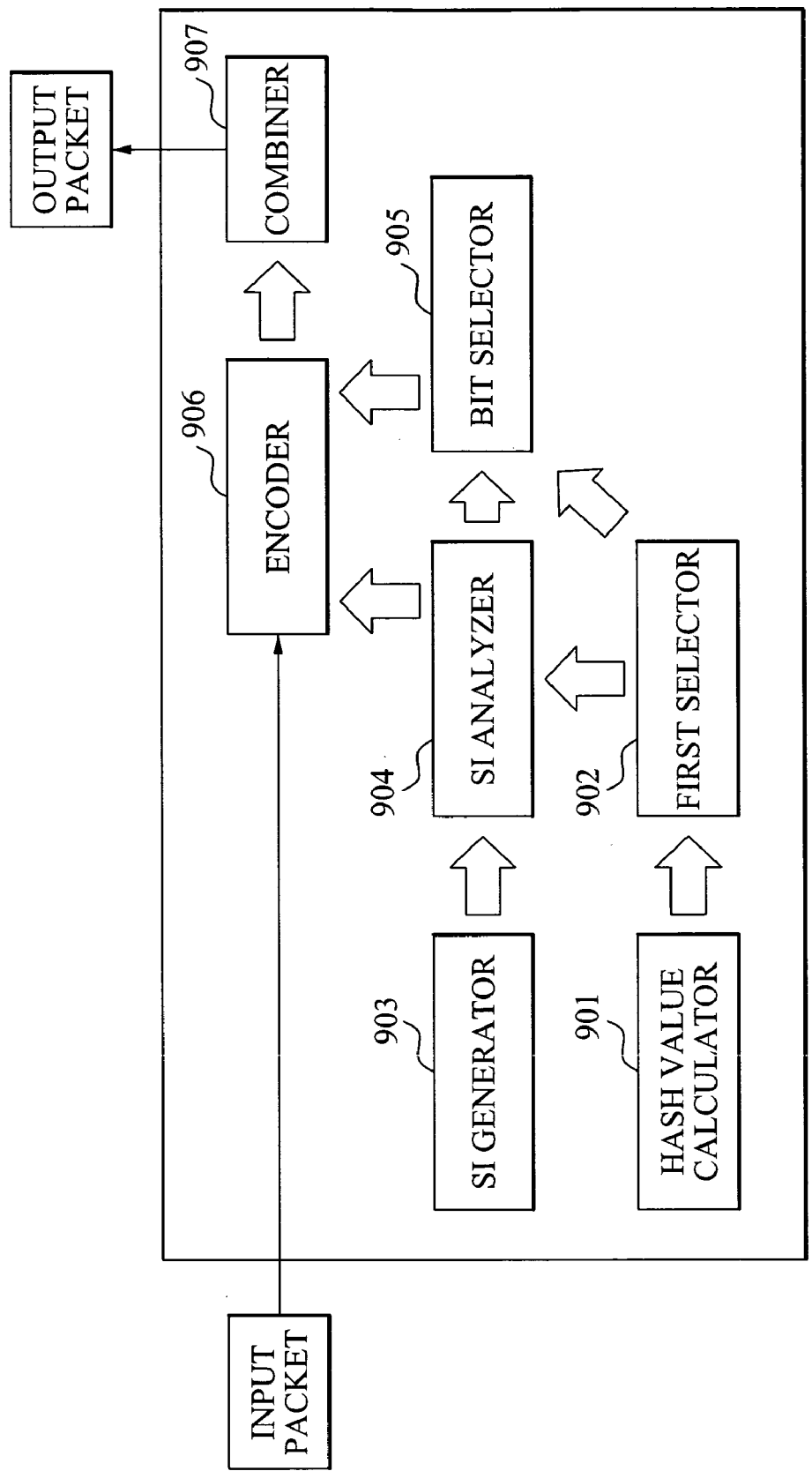
FIG. 9 is a block diagram illustrating an internal configuration of a sender of FIG. 1.

FIG. 9 is a block diagram illustrating an internal configuration of the sender 102 of FIG. 1. The sender 102 includes a hash value calculator 901, a first selector 902, an SI generator 903, an SI analyzer 904, a bit selector 905, an encoder 906, and a combiner 907.

The hash value calculator 901 calculates a hash value of data received over the signaling channel 101. All existing methods may be used to calculate the hash value. For example, SHA-1, SHA-256, SHA-384, SHA-512, MD5, and the like may be used to calculate the hash value.

The first selector 902 selects the first set of bits from the hash value. The first selector 902 may determine a group of bits, selected from the hash value, as the first set of bits using a selection mask. The selection mask has the same length as the hash value, and the selection mask may be pre-defined between the sender 102 and the receiver 103.

Accordingly, the length of the first set of bits is less than the length of the hash value. Depending on how the length of the first set of bits is set, it is possible to provide a higher security level or a higher transmission performance. Specifically, a larger value of the length of the first set of bits increases a BVS to be embedded with bits of the first set of bits. Therefore, it is possible to provide a higher security level. Also, a smaller value of the length of the first set of bits reduces a process of embedding the bits into the BVS and thus it is possible to provide a higher transmission performance.

The SI generator 903 generates SI. The SI may include at least one parameter, such as a SKIP_NUM, a REPEAT_COUNT, and an ENCODE_INTERVAL. The SKIP_NUM, the REPEAT_COUNT, and the ENCODE_INTERVAL may be used to determine an action of a BVS or to determine a bit position for selecting a single bit from the first set of bits.

The SI analyzer 904 determines an action of a BVS based on a number of bits of the first set of bits and the SI, and determines a bit position based on the SI. In an aspect of exemplary embodiment of the present invention, the SI analyzer 904 may include an action determination unit (not shown) for determining the action of the BVS based on a number of bits of the first set of bits and the SI, and a bit position determination unit (not shown) for determining the bit position based on the SI.

The action determination unit may determine the action of the BVS as either a process action to embed the bit into the BVS or a bypass action to not embed the bit into the BVS, based on the number of bits and the at least one parameter included in the SI. The bit position determination unit may determine the bit position to select the at least one bit from bits of the first set of bits based on the at least one parameter included in the SI. Specifically, the action determination unit and the bit position determination unit may determine the action and the bit position using the method as described above with FIGS. 5 and 6.

A data verification system according to an exemplary embodiment of the present invention may adjust various parameters included in the SI and thereby adjust characteristics, such as voice quality, a security level, transmission performance, transmission reliability, and the like. The voice quality or the transmission performance may be adjusted by adjusting the SKIP_NUM. For example, a larger SKIP_NUM may provide a higher voice quality, and a smaller SKIP_NUM value may provide a higher transmission performance. Also, the security level or the transmission performance may be adjusted by adjusting the REPEAT_COUNT.

A larger REPEAT_COUNT may provide a higher security level, and a smaller REPEAT_COUNT may provide a higher transmission performance.

Also, all the bits of the first set of bits are doubly embedded during the ENCODE_INTERVAL. Through this, it is possible to prevent a possibility of loss of a packet in a network. In other words, a longer ENCODE_INTERVAL may provide a more reliable transmission. A shorter ENCODE_INTERVAL may provide better voice quality with a relatively smaller number of packets.

The bit selector 905 selects at least one bit from bits of the first set of bits based on the bit position. A single bit may be selected based on the bit position. For example, when the bit position determination unit determines the bit position as '5', the bit selector 905 may select a fourth bit of the first set of bits as the single bit.

The encoder 906 embeds the bit into the BVS based on the action. In an aspect of exemplary embodiments of the present invention, the encoder 906 may include an action identification unit (not shown) for identifying the action of the BVS, and an embedding unit (not shown) for skipping the BVS when the action is a bypass action, and embedding the bit into the BVS when the action is a process action.

Frequency filtering of a signal represented by the BVS may be used to embed the bit into the BVS. For example, the method may use a first set of frequencies corresponding to embedding bit '0' and a second set of frequencies corresponding to embedding bit '1'. If a selected bit is '0', all the frequencies that are defined in the first set of frequencies may be removed from a voice signal and thereby the bit '0' may be embedded into the BVS. Also, if the selected bit is '1', all the frequencies that are defined in the second set of frequencies may be removed from the voice signal and thereby the bit '1' may be embedded into the BVS.

The combiner 907 combines the SI with the BVS embedded with the bit. In an aspect of exemplary embodiment of the present invention, the BVS combined with the SI may be transmitted to the receiver 103 over the voice channel 104. For the above operation, the sender 102 may further include a packet transmitter (not shown) for transmitting the BVS, combined with the synchronization information, to the receiver 103 as voice data over the voice channel.

Figure 10:
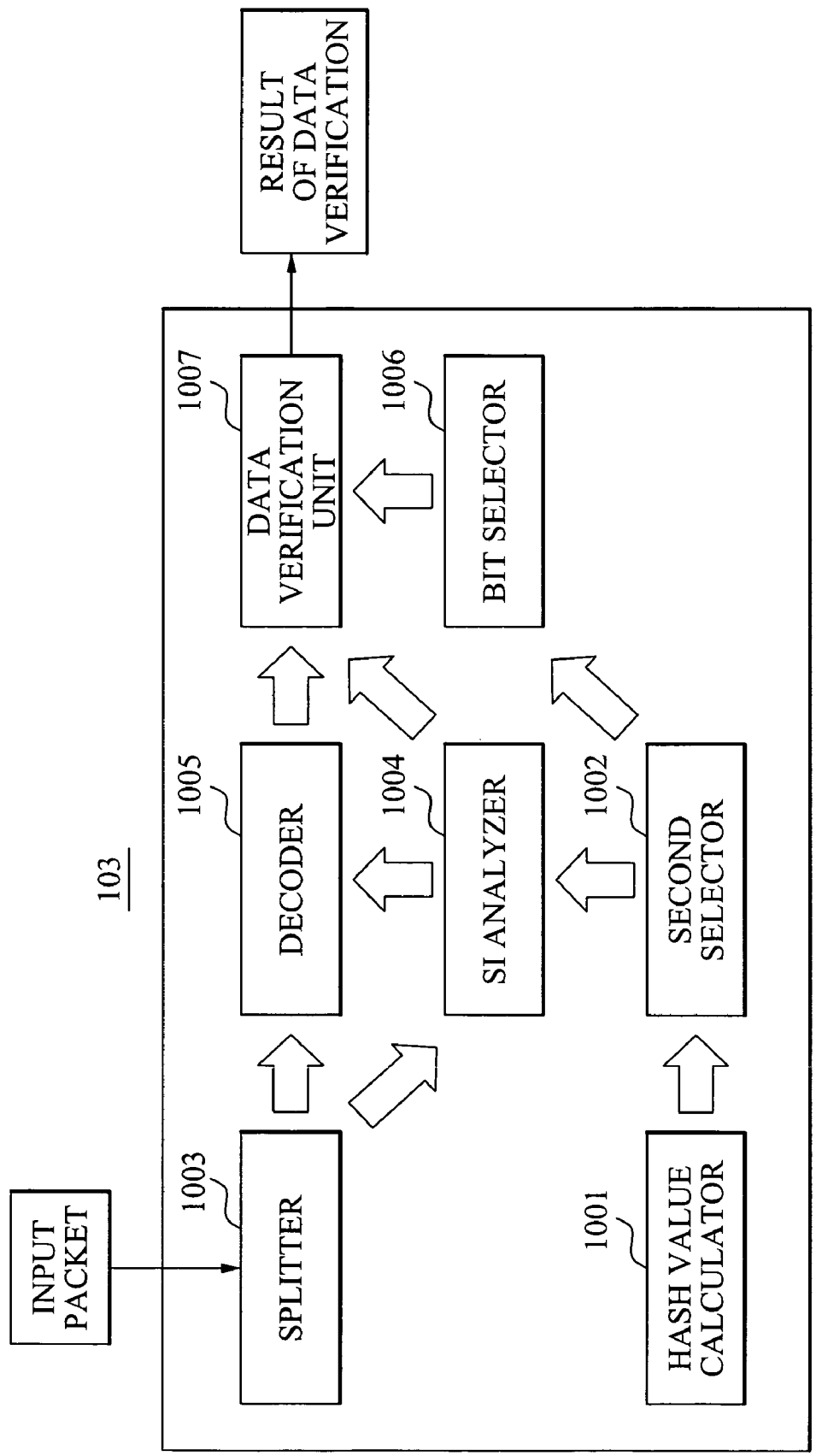
FIG. 10 is a block diagram illustrating an internal configuration of a receiver according to an exemplary embodiment of the present invention.

FIG. 10 is a block diagram illustrating an internal configuration of a receiver 103 according to an exemplary embodiment of the present invention. In an aspect of exemplary embodiment of the present invention, the receiver 103 includes a hash value calculator 1001, a second selector 1002, a splitter 1003, an SI analyzer 1004, a decoder 1005, a bit selector 1006, and a data verification unit 1007.

The hash value calculator 1001 calculates a hash value of data received over the signaling channel 101. The data may be stored separately from calculation of the hash value. The hash value may be calculated using the same method as the method of calculating the hash value in the sender 102. For example, when the sender 102 calculates the hash value of the data using SHA-256, the receiver 103 also may calculate the hash value of the data using SHA-256.

The second selector 1002 selects the second set of bits from the hash value. As described above, the second set of bits may be selected from bits of the second hash value using the selection mask that is pre-defined between the sender 102 and the receiver 103.

The splitter 1003 splits a BVS and SI from voice data that is received over the voice channel 104. The voice data may include at least one packet, and each of the at least one packet may include at least one SI and BVS. Specifically, the receiver 103 may receive the voice data and then split the BVS and the SI from a packet included in the voice data.

The SI analyzer 1004 determines an action of the BVS based on the SI and a number of bits of the second set of bits, and determines a bit position based on the SI. Here, a method of determining the action of the BVS and the bit position may use the above-described method of determining the action of the BVS and the bit position in the receiver 102, that is, the same method as described above with FIGS. 5 and 6.

The SI may include parameters, a SKIP_NUM, a REPEAT_COUNT, F and an ENCODE_INTERVAL. The SI analyzer 1004 may determine an action of a BVS as a process action and determine, as a bypass action, an action of the BVS corresponding to the SKIP_NUM with respect to other BVSs after the BVS. Next, the above process may be repeated as many times as the REPEAT_COUNT, and the entire process may be repeated as many times as the number of bits. The repeated number of times with respect to the entire process may be determined as a current bit position. Also, the SI analyzer 1004 may repeat all the processes during the ENCODE_INTERVAL, and determine all the actions of BVSs which are determined as either the process action or the bypass action. Also, the bit position may be determined to select a bit from the second set of bits.

The decoder 1005 extracts a first bit from the BVS based on the action. As described above, the action is determined as either a bypass action or a process action. The decoder 1005 may include an action identification unit (not shown) for identifying the action of the BVS; and a bit extractor (not shown) for skipping the BVS when the action is the bypass action, and extracting the first bit from the BVS when the action is the process action. Specifically, the BVS of which action is determined as the process action is the BVS of which action is also determined as the process action in the sender 102, and is embedded with the first bit. Therefore, the decoder 1005 may extract the first bit from the BVS of which action is determined as the process action.

In an aspect of exemplary embodiment of the present invention, a method of extracting the first bit in the decoder 1005 may use a method corresponding to a method of embedding the first bit in the encoder 906 of the sender 102. For example, similar with the encoder 906, the decoder 1005 may determine a first set of frequencies and a second set of frequencies, remove all the frequencies defined in the first set of frequencies from a voice signal thereby calculating power 'P0'. Also, the decoder 1005 may remove all the frequencies defined in the second set of frequencies from the same voice signal, calculate power 'P1', and then identify the first bit.

When 'P0'>'P1', '1' may be extracted as the first bit. When 'P0'<'P1', '0' may be extracted as the first bit. When 'P0'='P1', 'UNDECODED' may be output as a result. 'UNDECODED' denotes that the first bit cannot be determined. 'UNDECODED' may correspond to a predetermined integer denoting that the first bit cannot be determined.

The bit selector 1006 selects a second bit from the bits of the second set of bits based on the bit position. The bit selector 1006 may select a bit corresponding to the bit position, as the second bit, from the second set of bits. For example, when the bit position is '5', the bit selector 1006 may select a fourth bit of the second set of bits as the second bit.

The data verification unit 1007 verifies the data based on the action, the first bit, the second bit, and the bit position. In an aspect of exemplary embodiment of the present invention, the data verification unit 1007 may compare the first bit and the second bit with respect to the action corresponding to the process action, and verify the data when a number of matching bits between the first bit and the second bit is greater than a predetermined first number, and a number of non-matching bits between the first bit and the second bit is less than a predetermined second number.

The first number may be a minimum number of successful matching bits to verify the data. The second number may be a maximum number allowed with respect to a non-matching error. A larger minimum number may provide a higher security level, and a smaller minimum number may provide higher transmission performance since the data can be verified using a smaller size of voice data. Also, a smaller maximum number may allow less non-matching bits and thus provide a higher security level.

A result of the data verification may be provided for a user. The receiver 103 may further include a user interface to display the result of the data verification to the user.

As described above, a data verification method or a data verification system according to the present invention may transmit data over a signaling channel, and embed a set of bits, which is a subset with respect to a hash value of the data, into voice data that is transmitted over a voice channel, and transmit the same thereby verifying the data. Also, it is possible to select an appropriate parameter and thereby adjust characteristics, such as voice quality, transmission performance, a security level, transmission reliability, and the like.

The data verification method according to the above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

According to an exemplary embodiment of the present invention, there is provided a method and system of data verification that can transmit data over a signaling channel, embed a set of bits into voice data, and transmit the same, and thereby verify the data. The voice data is transmitted over a voice channel, and the set of bits is a subset of bits with respect to a hash value of the data.

Also, according to another exemplary embodiment of the present invention, there is provided a method and system of data verification that can select an appropriate parameter, and thereby adjust characteristics, such as voice quality, transmission performance, a security level, and the like.

While the present invention has shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A method of verifying data, the method comprising:
transmitting the data from a sender to a receiver over a signaling channel;
calculating a hash value of the data;
selecting a first set of bits from the hash value;
determining an action of a block of voice samples (BVS), and determining a bit position of the first set of bits based on a number of bits of the first set of bits and synchronization information (SI);
selecting a bit corresponding to the bit position from the bits included in the first set of bits;
embedding the first set of bits into voice data based on the selected bit and the action;
transmitting the voice data embedded with the first set of bits to the receiver over the voice channel; and
verifying the data through a comparison between the first set of bits and a second set of bits,
wherein the second set of bits is generated based on the data in the receiver.

2. The method of claim 1, wherein:
the first set of bits and the second set of bits are a group of bits that are selected from a hash value using a selection mask in the sender and the receiver respectively, the section mask having the same length as the hash value, the hash value being calculated based on the data; and
the selection mask is pre-defined between the sender and the receiver.

3. The method of claim 1, wherein:
the action is to determine whether to embed the bit into the BVS; and
the action comprises a process action that indicates a BVS to be embedded with the bit, and a bypass action that indicates a BVS to not be embedded with the bit.

4. The method of claim 1, wherein:
the synchronization information comprises parameters, a number of skips, a count of repeats, and an encoding interval; and
the determining the action and the bit position comprises the steps of:
a first step of determining an action for a random BVS as a process action;
a second step of determining, as a bypass action, an action of the BVS corresponding to the number of skips with respect to BVS after the random BVS;
a third step of repeating, as many times as the count of repeats, the first step and the second step with respect to a following BVS;
a fourth step of repeating the third step as many times as the number of bits;
a fifth step of determining the number of repeats in the fourth step as a current bit position; and
a sixth step of repeating the fourth step and the fifth step during the encoding interval.

5. The method of claim 1, wherein:
the embedding the first set of bits based on the bit; and
the action comprises the steps of:
a first step of identifying the action of the BVS; and
a second step of embedding the bit into the BVS when the action is a process action.

6. The method of claim 5, wherein the embedding the first set of bits based on the bit and the action further comprises:
a third step of skipping the BVS when the action is a bypass action; and
a fourth step of repeating the first through the third steps with respect to all the BVSs of which actions are determined.

7. The method of claim 1, wherein the step of transmitting the voice data comprises:
combining synchronization information with the voice data embedded with the first set of bits; and
transmitting the combination to the receiver.

8. The method of claim 1, wherein the step of verifying the data comprises:
calculating a hash value of the data, wherein the data is received over the signaling channel from the sender;
selecting the second set of bits from the hash value; and
verifying the data through the comparison between the first set of bits and the second set of bits, the first set of bits being received from the sender over the voice channel.

9. The method of claim 8, wherein:
the first set of bits is embedded within a BVS and received together with the BVS;
the BVS is included in voice data received over the voice channel; and
the voice data further comprises synchronization information.

10. The method of claim 8, wherein the step of verifying the data comprises:
splitting a BVS and synchronization information from voice data, the voice data being received over the voice channel;
determining a bit position and an action of the BVS based on the synchronization information and a number of bits of the second set of bits;
extracting a first bit from the BVS based on the action;
selecting a second bit from the second set of bits based on the bit position; and
verifying the data based on the action, the first bit, the second bit, and the bit position.

11. The method of claim 10, wherein:
the synchronization information comprises parameters, a number of skips, a count of repeats, and an encoding interval; and
the determining the action and the bit position comprises the steps of:
a first step of determining an action of a BVS as a process action;
a second step of determining, as a bypass action, an action of the BVS corresponding to the number of skips with respect to other BVS after the BVS;
a third step of repeating, as many times as the count of repeats, the first step and the second step with respect to a following BVS;
a fourth step of repeating the third step as many times as the number of bits;
a fifth step of determining the number of repeats in the fourth step as a current bit position; and
a sixth step of repeating the fourth step and the fifth step during the encoding interval.

12. The method of claim 10, wherein:
the action is determined as either a process action or a bypass action; and
the extracting comprises:
identifying the action of the BVS and skipping the BVS when the action is the bypass action; and
extracting the first bit from the BVS when the action is the process action.

13. The method of claim 10, wherein verifying the data based on the action, the first bit, the second bit, and the bit position comprises:
comparing the first bit and the second bit with respect to the action corresponding to the process action; and
verifying the data when a number of matching bits between the first bit and the second bit is greater than a predetermined first number, a number of non-matching bits between the first bit and the second bit being less than a predetermined second number.

14. The method of claim 13, wherein:
the first number of bits is a minimum number of successful matchings for verifying the data, and
the second number of bits is an allowed maximum number with respect to a non-matching error.

15. The method of claim 1, further comprising providing a result of the data verification to a user via the receiver.

16. A data verification system, comprising:
a sender configured to:
transmit data over a signaling channel; and
transmit a first set of bits over a voice channel, the first set of bits being generated based on the data; and
a receiver configured to:
receive the data;
generate a second set of bits based on the received data;
compare the first set of bits with the second set of bits; and
verify the data,
wherein the sender comprises:
a hash value calculator configured to generate a hash value of the data;
a first selector configured to select the first set of bits from the hash value;
a synchronization information (SI) generator configured to generate synchronization information;
an SI analyzer configured to determine an action of a block of voice samples (BVS) based on a number of bits of the first set of bits and the synchronization information, and determining a bit position based on the synchronization information;
a bit selector configured to select at least one bit from bits of the first set of bits based on the bit position; and
an encoder configured to embed the bit within the BVS based on the action.

17. The system of claim 16, wherein:
the first set of bits and the second set of bits comprise a group of bits that are selected from a hash value using a selection mask in the sender and the receiver respectively, the second mask having the same length as the hash value, the hash value being calculated based on the data; and
the selection mask is pre-defined between the sender and the receiver.

18. The system of claim 16, wherein the receiver comprises:
a hash value calculator configured to calculate a hash value of the data;
a second selector configured to select the second set of bits from the hash value;
a splitter configured to split the BVS and synchronization information from voice data, the voice data being received over the voice channel;
a synchronization information (SI) analyzer configured to determine an action of the BVS based on the synchronization information and a number of bits of the second set of bits, and determining a bit position based on the synchronization information;
a decoder configured to extract a first bit from the BVS based on the action;

a bit selector configured to select a second bit from the bits of the second set of bits based on the bit position; and a data verification unit configured to:
verify the data based on the first bit, the second bit, the action, and the bit position;
compare the first bit and the second bit with respect to the action corresponding to the process action; and
verify the data when a number of matching bits between the first bit and the second bit is greater than a predetermined first number, and a number of non-matching bits between the first bit and the second bit is less than a predetermined second number.

19. The system of claim 18, wherein:
the sender further comprises:
a combiner configured to combine the synchronization information with the BVS embedded with the bit; and
a packet transmitter configured to transmit the BVS, combined with the synchronization information, to the receiver as voice data over the voice channel; and
the BVS combined with the synchronization information is transmitted to the receiver over the voice channel.

20. The system of claim 18, wherein the SI analyzer comprises:
an action determination unit configured to determine an action of the BVS based on the synchronization information and the number of bits of the first set of bits;
a bit position determination unit configured to determine the bit position based on the synchronization information;
an action identification unit configured to identify the action of the BVS; and
an embedding unit configured to:
skip the BVS when the action is a bypass action; and
embed the bit into the BVS when the action is a process action.

21. The system of claim 20, wherein:
the synchronization information comprises at least one of: parameters, a number of skips, a count of repeats, and an encode interval;
the action determination unit is further configured to determine the action of the BVS as either a process action to embed the bit into the BVS or a bypass action to not embed the bit into the BVS, based on the number of bits and the at least one parameter comprised in the synchronization information; and
the decoder comprises:
an action identification unit configured to identify the action of the BVS; and
a bit extractor configured to skip the BVS when the action is the bypass action, and extracting the first bit from the BVS when the action is the process action.

22. The system of claim 20, wherein:
the synchronization information comprises at least one of: parameters, a number of skips, a count of repeats, and an encode interval; and
the bit position determination unit is further configured to determine the bit position to select the at least one bit from bits of the first set of bits based on the at least one parameter comprised in the synchronization information.

23. A method of encrypting data by a data encryption apparatus, the method comprising:
calculating a hash value of the data, by a hash value calculator of the apparatus, the data configured to be transmitted from a sender to a receiver over a signaling channel;
selecting a first set of bits from the hash value, by a first selector of the apparatus;
determining an action of a block of voice samples (BVS), by a synchronization information (SI) analyzer of the apparatus, and determining a bit position of the first set of bits based on a number of bits of the first set of bits and synchronization information (SI), by the SI analyzer;
selecting a bit corresponding to the bit position from the bits included in the first set of bits, by a bit selector of the apparatus;
embedding the first set of bits into voice data based on the selected bit and the action, by an encoder of the apparatus.

24. A data encryption apparatus, comprising:
a hash value calculator configured to calculate a hash value of data, the data to be transmitted from a sender to a receiver over a signaling channel;
a first selector configured to select the first set of bits from the hash value;
a synchronization information (SI) generator configured to generate synchronization information;
a synchronization information (SI) analyzer configured to:
determine an action of a block of voice samples (BVS) based on a number of bits of the first set of bits and the synchronization information; and
determine a bit position based on the synchronization information;
a bit selector configured to select at least one bit from bits of the first set of bits based on the bit position; and
an encoder configured to embed the bit within the BVS based on the action.

25. A data verification apparatus, comprising:
a hash value calculator configured to calculating a hash value of data transmitted from a sender;
a second selector configured to selecting the second set of bits from the hash value;
a splitter configured to splitting block of voice samples (BVS) and synchronization information from voice data, wherein the voice data is received over the voice channel;
a synchronization information (SI) analyzer configured to determining an action of the BVS based on the synchronization information and a number of bits of the second set of bits, and determining a bit position based on the synchronization information;
a decoder configured to extracting a first bit from the BVS based on the action;
a bit selector configured to selecting a second bit from the bits of the second set of bits based on the bit position; and
a data verification unit for verifying the data based on a first bit transmitted from the sender via a signal channel, the second bit, the action, and the bit position, and compares the first bit and the second bit with respect to the action corresponding to the process action, and verifies the data when a number of matching bits between the first bit and the second bit is greater than a predetermined first number, and a number of non-matching bits between the first bit and the second bit is less than a predetermined second number.

* * * * *